(12) United States Patent
van Schaik et al.

(10) Patent No.: US 9,639,352 B1
(45) Date of Patent: May 2, 2017

(54) COMPUTING REWORK CHURN FOR CONTRIBUTIONS TO A CODE BASE

(71) Applicant: SEMMLE LIMITED, Oxford (GB)

(72) Inventors: Sebastiaan Johannes van Schaik, Oxford (GB); Stephen Philip Buckley, Oxford (GB); Yorck Huenke, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/291,825

(22) Filed: Oct. 12, 2016

(51) Int. Cl.
*G06F 9/44* (2006.01)

(52) U.S. Cl.
CPC . *G06F 8/75* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 5,860,011 A | 1/1999 | Kolawa et al. | |
| 7,647,579 B2 | 1/2010 | Drissi et al. | |
| 7,694,181 B2 | 4/2010 | Noller et al. | |
| 7,778,866 B2 | 8/2010 | Hughes | |
| 7,996,373 B1 | 8/2011 | Zoppas et al. | |
| 8,091,055 B2 | 1/2012 | Brelsford et al. | |
| 8,214,798 B2 | 7/2012 | Bellucci et al. | |
| 8,336,030 B1 | 12/2012 | Boissy | |
| 8,356,278 B2 | 1/2013 | Drissi et al. | |
| 8,359,495 B2 | 1/2013 | Candea et al. | |
| 8,413,108 B2 | 4/2013 | Groves et al. | |
| 8,473,893 B2 | 6/2013 | Poole et al. | |
| 8,499,278 B2 | 7/2013 | Hughes | |
| 8,640,101 B2 | 1/2014 | Spurlin | |
| 9,208,056 B1 | 12/2015 | Henriksen et al. | |
| 9,208,164 B2 * | 12/2015 | Clemm | G06F 17/2211 |
| 9,304,760 B2 | 4/2016 | Hey, Jr. et al. | |
| 9,305,279 B1 * | 4/2016 | Menzel | G06Q 10/06398 |
| 9,507,590 B2 | 11/2016 | Henriksen et al. | |
| 2004/0117761 A1 * | 6/2004 | Andrews | G06F 11/3604 717/101 |
| 2004/0139370 A1 | 7/2004 | Bailey et al. | |

(Continued)

OTHER PUBLICATIONS

Corley et al., "Recovering traceability links between source code and fixed bugs via patch analysis," May 2001, 7 pages.

(Continued)

*Primary Examiner* — Philip Wang
(74) *Attorney, Agent, or Firm* — Fish & Richardson P.C.

(57) ABSTRACT

Methods, systems, and apparatus, including computer programs encoded on computer storage media, for generating widened types for computing measures of rework normalized churn. One of the methods includes determining a plurality of commit chains for a software developer. Respective measures of rework churn occurring in each commit chain are calculated. An overall rework factor is computed for the developer using the respective measures of rework churn for each commit chain in the plurality of commit chains for the developer. A measure of rework normalized churn is computed for the developer including adjusting the initial measure of churn by the overall rework factor. Productivity of the developer is quantified relative to one or more other developers using the measure of rework normalized churn for the developer.

30 Claims, 7 Drawing Sheets

(56) References Cited

U.S. PATENT DOCUMENTS

| | | |
|---|---|---|
| 2006/0123389 A1 | 6/2006 | Kolawa et al. |
| 2010/0262473 A1 | 10/2010 | Hughes |
| 2013/0007704 A1 | 1/2013 | Haynes et al. |
| 2013/0055205 A1 | 2/2013 | Sereni et al. |
| 2014/0149435 A1 | 5/2014 | Sisman et al. |
| 2014/0201573 A1 | 7/2014 | Huang |
| 2014/0279903 A1* | 9/2014 | Hsiao ................ G06F 17/30377 707/638 |
| 2014/0297592 A1 | 10/2014 | Ohtake et al. |
| 2015/0052108 A1 | 2/2015 | Volk et al. |
| 2015/0309790 A1 | 10/2015 | Henriksen et al. |
| 2015/0324195 A1 | 11/2015 | Henriksen et al. |

OTHER PUBLICATIONS

Palix et al., "Tracking Code Patterns Over Multiple Software Versions with Herodotos", 17. Proceedings of the Eighth International Conference on Aspect-Oriented Software Development, AOSD '10, Mar. 2010, pp. 169-180.

Sisman et al., "Incorporating version histories in information retrieval based bug localization," Jun. 2012, 10 pages.

Wang et al., "Version history, similar report, and structure: putting them together for improved bug localization," Jun. 2014, 11 pages.

Spacco et al., "Tracking defect warnings across versions," Proceedings of the 2006 International Workshop on Mining Software Repositories, MSR '06, May 22, 2005, pp. 133-136, XP055212551.

Extended European Search Report issued in European Application No. 15196029.1 on Mar. 9, 2016, 8 pages.

\* cited by examiner

COMPUTING REWORK CHURN FOR CONTRIBUTIONS TO A CODE BASE

BACKGROUND

This specification relates to static analysis of software source code.

Static analysis refers to techniques for analyzing computer software source code without executing the source code as a computer software program. Static analysis systems analyze source code to determine various properties about source code in a code base and properties of developers who commit code to the code base.

Source code is typically maintained by developers in a code base of source code using a version control system. Version control systems generally maintain multiple revisions of the source code in the code base, each revision being referred to as a commit or a snapshot. Each snapshot includes the source code of files of the code base as the files existed at a particular point in time.

Relationships among snapshots stored in a version control system can be represented as a directed, acyclic revision graph. Each node in the revision graph represents a commit of some portion of the source code of the code base. Each commit identifies source code of a particular snapshot as well as other pertinent information about the snapshot, such as the author of the snapshot and data about ancestors of the commit in the revision graph. A directed edge from a first node to a second node in the revision graph indicates that a commit represented by the first node occurred before a commit represented by the second node, and that no intervening commits exist in the version control system.

A static analysis system can analyze source code of a particular snapshot of the code base to identify characteristic segments of source code in the snapshot. For example, a static analysis system can identify violations in the source code of a particular set of coding standards. A static analysis system can also identify a responsible contributor for each characteristic segment of source code and attribute the characteristic segment to the responsible contributor, e.g., to a particular developer or group of developers.

A static analysis system can rank developers according to a number of lines of code added, deleted, or changed, which will be referred to as the churn or number of lines of churn, by each particular developer. Churn is a rough proxy for productivity for a developer as it represents how many lines of code a developer has changed in the code base.

Churn can be computed for a developer between any arbitrary pair of snapshots in a revision graph. However, typically churn typically is computed between adjacent snapshots in the revision graph that were both committed by a same developer.

SUMMARY

This specification describes how a static analysis system can generate normalized churn attributed to developers by a measure of rework by the developer. This measure will be referred to as rework normalized churn. Using rework normalized churn as a developer metric puts developers on an equal footing regardless of demonstrated rework tendencies that tend to inflate measures of churn for some developers.

Particular embodiments of the subject matter described in this specification can be implemented so as to realize one or more of the following advantages. Using rework normalized churn to rank developers provides a more accurate comparison between developers. Rework normalized churn is less susceptible to churn that is heavily influenced by rework. Using rework normalized churn allows for more accurate quantification of developers' productivity regardless of differences in the developers' individual commit tendencies. Unlike using measures of raw churn, rework normalized churn is not biased toward developers who commit their changes more often to a version control system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a diagram of an example system.
Like reference numbers and designations in the various drawings indicate like elements.

DETAILED DESCRIPTION

This specification describes how a static analysis system can compute a measure of rework normalized churn for a particular responsible entity, which may be a developer or a group of developers. For brevity the examples below make reference to a developer, but the same techniques can be applied to any appropriate responsible entity, e.g., a team of developers, developers in a particular business unit, or developers working on a particular project.

Central to the concept of rework normalized churn is the notion of rework churn, or simply rework for brevity. Rework churn represents modifications to lines of source code that have already been modified previously within the same commit chain. Thus, rework churn is changes to source code that are introduced by a developer in a chain of commits, but which are changed again afterwards before the chain of commits is merged with another chain. Typically, the rework churn is changed again shortly after being introduced. As a result, the original change, which will have counted toward the contributor's churn, may have been part of the code base only very briefly. Rework churn thus commonly includes multiple modifications that occur between individual commits in a commit chain, but at most a single modification when the commit chain is merged with the rest of the code base.

Figure 1A:
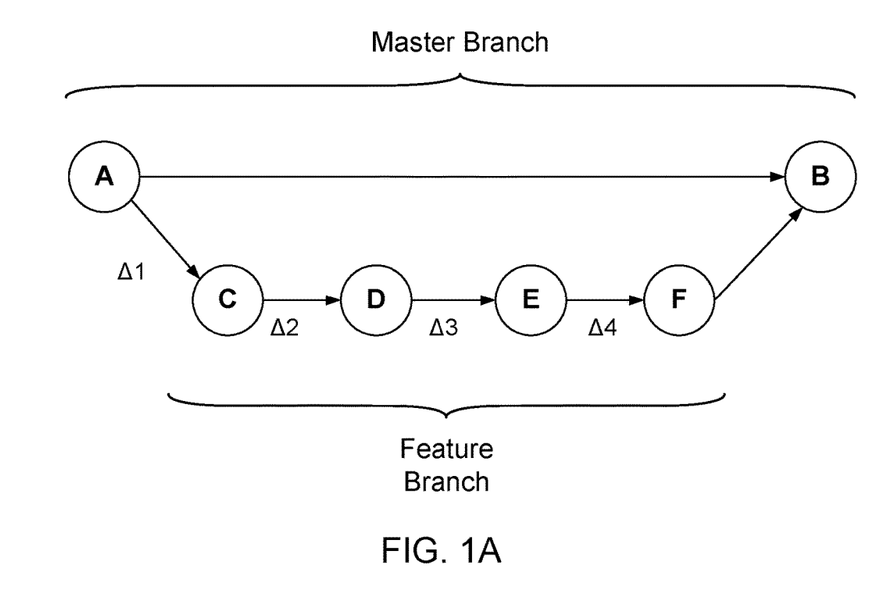
FIG. 1A illustrates one typical feature branch pattern.

FIG. 1A illustrates one typical feature branch pattern. A code base starts with a snapshot A and transitions to a snapshot B. The path from A to B is referred to as the master branch because snapshots in the master branch represent the current master version of the software. For example, snapshots in the master branch can represent the most up-to-date publicly available releases of the software.

A feature branch runs parallel to the master branch. The feature branch can include snapshots that were committed by a developer working on implementing a new feature for the code base. Often, the snapshots of the feature branch are not publicly available. Thus, the feature is only available for release when the last snapshot of the feature branch is merged back into the master branch, e.g., at snapshot B.

In this example, the feature branch has four snapshots. The last snapshot of the feature branch is then merged into the snapshot B to introduce the new feature into the master branch.

Within the commits of the feature branch, the developer contributes churn to the code base, which is measured by a number of lines of code added, deleted, or changed, between adjacent snapshots of the revision graph. For example, between snapshot A and snapshot C, the developer contributed $\Delta 1$ lines of churn, between snapshot C and snapshot D, the developer contributed $\Delta 2$ lines of churn, and so on. Thus, in this example, the developer would get credit for $\Delta 1 + \Delta 2 + \Delta 3 + \Delta 4$ lines of churn.

Figure 1B:
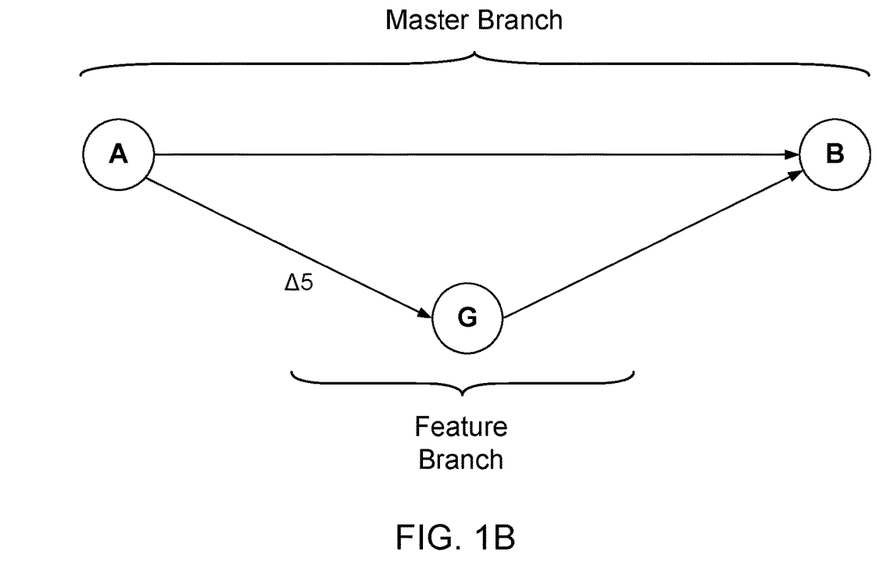
FIG. 1B illustrates another typical feature branch pattern.

FIG. 1B illustrates another typical feature branch pattern. Some developers prefer to squash all of their commits of a feature branch into a single snapshot of the revision graph. In FIG. 1B, another developer who implements the same feature might squash all commits into a single snapshot G before merging the feature into the snapshot B.

In this example, the developer would get credit for $\Delta 5$ lines of churn.

However, even if snapshots F and G were identical, $\Delta 5$ is almost never equal to $\Delta 1 + \Delta 2 + \Delta 3 + \Delta 4$. Thus, even though the developers implemented identical code, the amount of churn will vary.

This is because in a feature branch, work that is done often gets undone or remodified in later commits in the feature branch. For example, the churn of $\Delta 3$ may represent deleting or rewriting a function that was added by $\Delta 2$. This kind of churn, which does not contribute to the long-term progress of the project, will be referred to as rework churn. Intuitively, rework churn can represent modifications to source code that are again modified before the source code is considered to be a finished product.

This illustrates that mere differences in commit frequency of particular developers as well as their tendency to commit prototyped code contribute significantly to variances in total churn attributed to those developers.

Thus, a static analysis system can determine levels of rework typically committed by particular developers and adjust churn values appropriately to reflect such tendencies to commit rework churn. Thereafter, developers who contribute roughly equal amounts of productive churn can be ranked similarly according to a measure of rework normalized churn.

Generating measures of rework normalized churn requires obtaining statistics about each developer's commit tendencies. To do so, a static analysis system can segment a revision graph into discrete commit chains attributed to the developer.

In this specification, a commit chain, or for brevity, a chain, refers to a sequence of adjacent commits by a same developer having particular properties, which are explained below. The commits in the chain are ordered according to the directional links in the revision graph, with older snapshots occurring before newer snapshots in the chain. Intuitively, each commit chain can represent a delineated piece of work committed by a single developer over one or more snapshots, e.g., fixing a bug or implementing a new feature. Commit chains having snapshots contributed by a developer can be described as the developer having the commit chains or the commit chains belonging to the developer.

In some implementations, the system generates commit chains having the following properties:

First, every commit i+1 in a commit chain is a child commit in the revision graph of the commit i in the commit chain. In other words, a commit chain is a linear sequence of adjacent commits in the revision graph. Thus, a commit chain never includes a branch, and sibling commits cannot occur in the same commit chain.

Second, every commit in the commit chain is attributed to the same developer. In other words, the commit chains do not contain any intervening commits by other developers. This ensures that the rework tendencies of a particular developer are not influenced by the work of other developers.

Third, no commit in a commit chain is a merge commit. A merge commit occurs when changes from multiple parent snapshots are merged into a child snapshot. For example, in FIG. 1A, snapshot B is a merge commit because changes from snapshot A and snapshot F are merged into snapshot B. This property helps to avoid ambiguity. In addition, merge commits often represent the end of a delineated piece of work, e.g., when a feature branch is merged back into a master branch. Therefore, commit chains do not contain merge commits.

The system can also optionally impose one or both of the following fourth and fifth properties:

Fourth, optionally, no commit in a commit chain, other than possibly commit 1 in the commit chain, has a non-merge sibling attributed to the same developer. Thus, the commit chain ends at commit N, where N>1, if a commit N+1 has a non-merge sibling attributed to the same developer. In other words, a commit chain ends if commits by a same developer branch. Thus, if a sequence of commits by the developer branches, the commit chain ends at the parent of the branching siblings.

Fifth, optionally, no commit in a commit chain, other than possibly commit 1 in the commit chain, has a sibling that is a merge commit. Thus, the commit chain ends at commit N, where N>1, if a commit N+1 has a sibling that is a merge commit. As stated above, merge commits often represent the end of a piece of work. Thus, the commit chain ends just before any merge commit. In contrast to the fourth property, a sibling that is a merge commit can be committed by any other developer, and not necessarily by the same developer of the commit chain.

Last, each commit chain is the longest possible commit chain having the relevant properties. In other words, each chain is as long as possible considering the criteria being used.

In addition to the properties of individual commit chains, the set of all commit chains used to compute reworked churn must also satisfy the following properties: (1) every non-merge commit is part of a commit chain (completeness), and (2) no commit is part of more than one commit chain (non-overlapping).

In other words, every non-merge commit is part of exactly one commit chain. This avoids omission or double-counting of churn.

If only a sub-graph of the entire commit graph is of interest for the purpose of computing rework churn, commits that are not of interest can first be removed from the graph. The computation described in this document can then be performed on the sub-graph of interest, so that all commits of the sub-graph occur in at least one commit chain.

Alternatively, the commit chain generation can be performed on the entire graph, and then commit chains can be trimmed to correspond to the sub-graph by removing any commits that do not occur in the sub-graph.

Figure 2A:
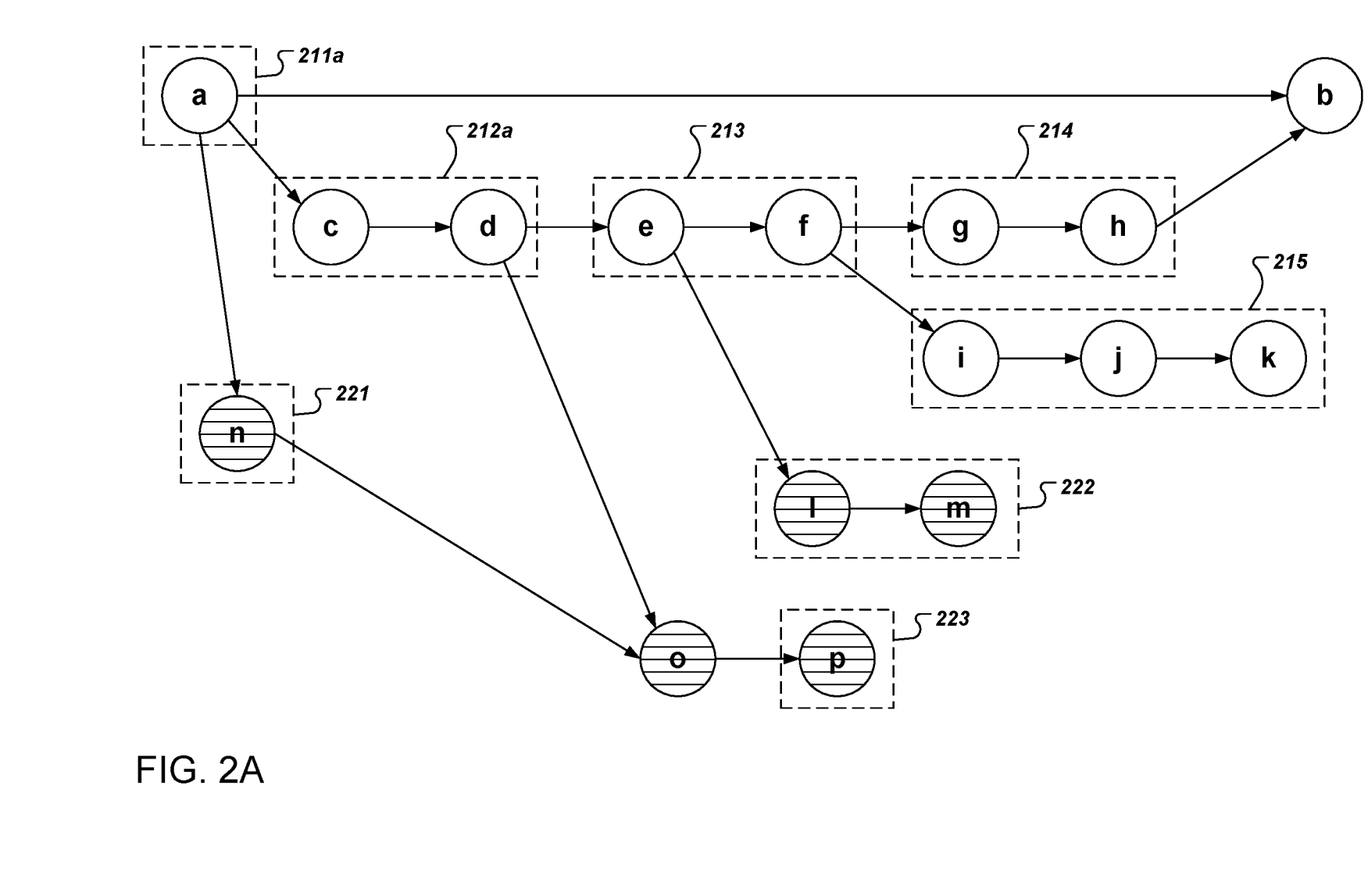
FIG. 2A illustrates a revision graph segmented into commit chains according to all five commit chain properties.

FIG. 2A illustrates a revision graph segmented into commit chains according to all five commit chain properties. The revision graph in FIG. 2A illustrates the resulting commit chains when a system imposes all five commit chain properties as set forth above, including the optional fourth and fifth properties.

The revision graph contains multiple snapshots a-p. The unfilled nodes in FIG. 2 that lack lined backgrounds, e.g., the node for snapshot a, represent commits by a first developer. The nodes filled with a lined background, e.g. the node for snapshot n, represent commits by a different second developer.

Thus, the first developer has commit chains 211-215, and the second developer has commit chains 221-223.

Commit chain 211 ends after only one commit because of property 5. That is, the snapshot c has a sibling that is a merge commit, snapshot b. Likewise, commit chain 212 ends after two commits because of property 5. The snapshot e has a sibling that is a merge commit—the snapshot o. This is true even though the merge commit in snapshot o was attributed to a different developer.

Commit chain 213 ends after two commits because of property 4. That is, the snapshot g has a sibling committed by the same developer.

Commit chain 214 ends after two commits because of property 3, which forbids merge commits. In other words, the commit chain 214 is the longest commit chain that is possible within adding a merge commit in snapshot b.

Likewise and for the second developer, the commit chain 221 ends after one commit because of property 3.

The commit chain 222 ends after two commits because the commit m has no children. Thus, it is the longest possible commit chain for that part of the graph. The commit chains 215 and 223 end for the same reason.

Figure 2B:
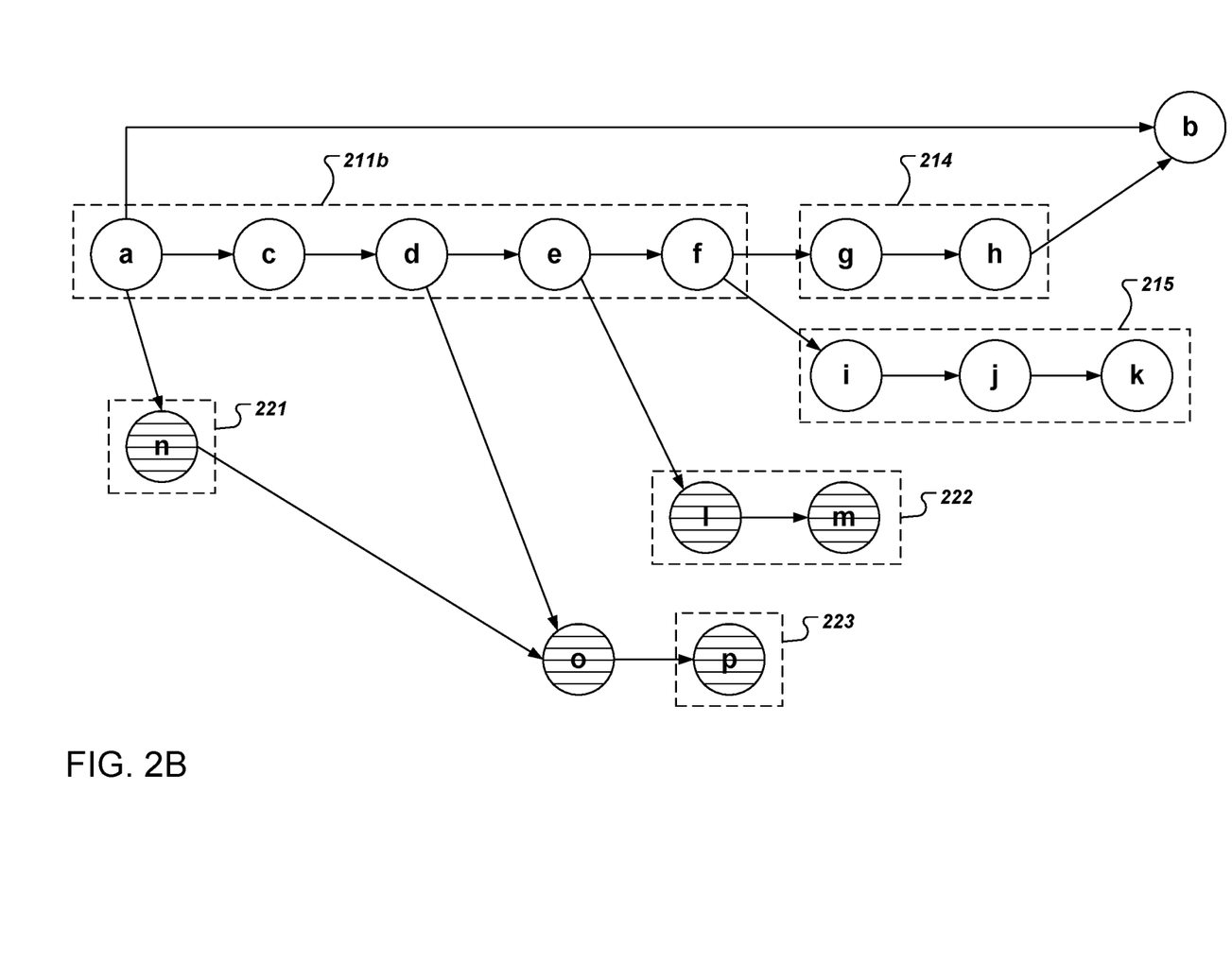
FIG. 2B illustrates a revision graph segmented into commit chains according to only the first four commit chain properties.

FIG. 2B illustrates a revision graph segmented into commit chains according to only the first four commit chain properties. The revision graph in FIG. 2B has the same snapshots a-p as the revision graph in FIG. 2B. However, the commit chains in FIG. 2B illustrate the result when a system does not enforce the fifth property.

Thus, the commit chain 211b includes snapshots a, c, d, e, and f because property 5, whether or not the snapshots have a sibling that is a merge commit, is not enforced. The rest of the commit chains are the same as illustrated in FIG. 2A.

Figure 2C:
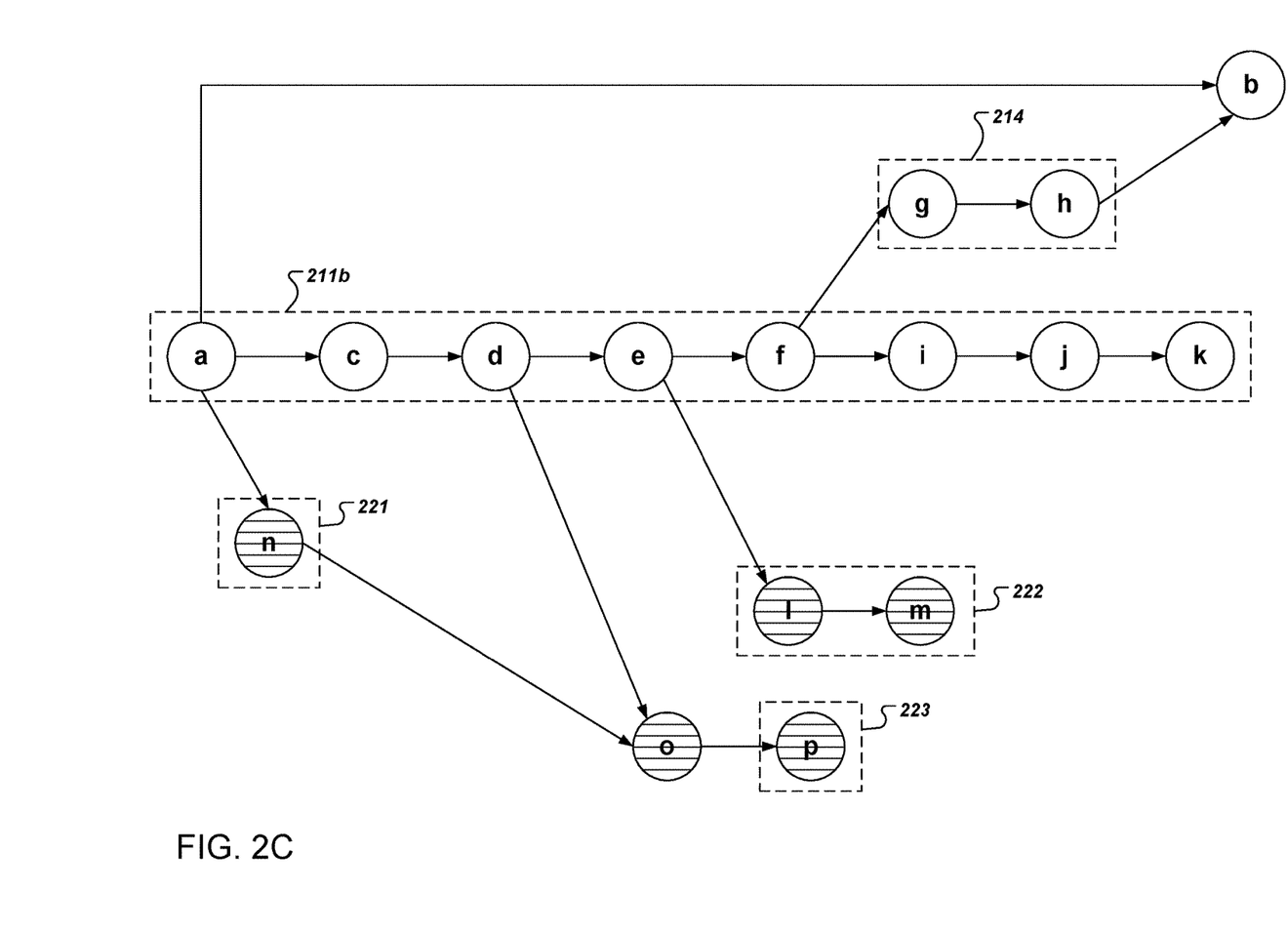
FIG. 2C illustrates a revision graph segmented into commit chains according to only the first three commit chain properties.

FIG. 2C illustrates a revision graph segmented into commit chains according to only the first three commit chain properties. The revision graph in FIG. 2C has the same snapshots a-p as the revision graph in FIG. 2A. However, the commit chains in FIG. 2C illustrate the result when a system does not enforce the fourth property or the fifth property.

Thus, the commit chain 211c has all the snapshots that the commit chain 211b has, as well as snapshots i, j, and k.

Because property 4 is not being enforced, a branch in the graph does not necessarily end the commit chain. Thus, the system must choose which branch, if any, to include in a commit chain because sibling commits cannot occur in the same commit chain. Therefore, the commit chain 211c could have alternatively included g and h instead of i, j, and k. In some implementations, the system determines which snapshots of a branch to include by determining which branch of snapshots generates the longest commit chain. Because including the branch that includes i, j, and k results in a longer commit chain, the system can include i, j, and k in the commit chain 211c instead of the branch that includes g and h.

If two candidate branches would result in commit chains of equal length, the system can choose either branch arbitrarily or by some other criteria. Alternatively, the system can enforce property 4 when encountering candidate branches having equal lengths and end the commit chain before the branch.

Figure 3:
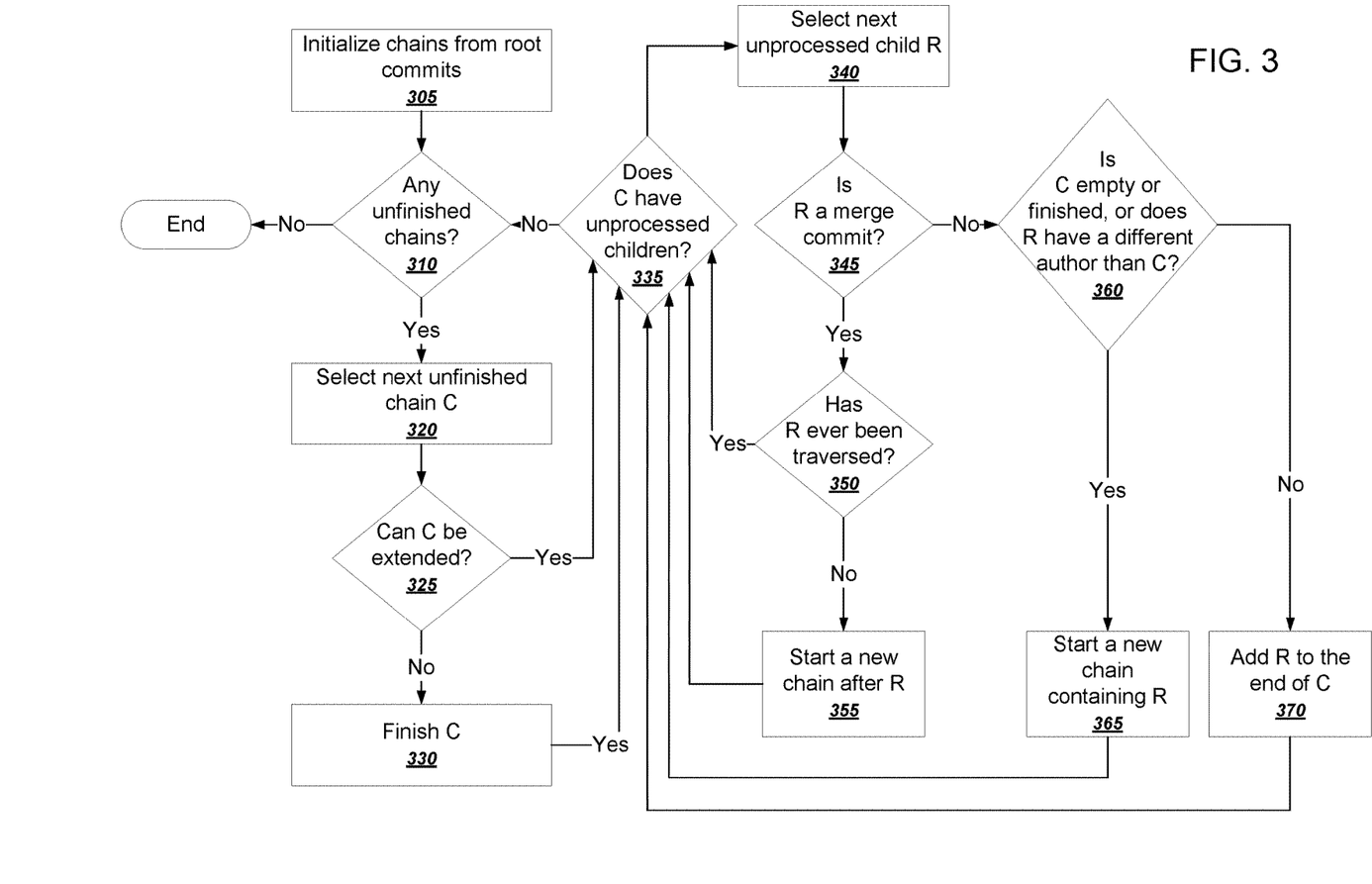
FIG. 3 is a flow chart for generating commit chains for a particular developer.

FIG. 3 is a flow chart for generating commit chains for a particular developer. A static analysis system can generate commit chains in order to compute statistics that represent the commit tendencies of particular developers, which will be described in more detail below with reference to FIG. 4. The process in FIG. 3 will be described as being performed by an appropriately programmed system of one or more computers.

The system initializes chains from root commits (305). Each root commit is a commit having zero parents in the revision graph. To initialize a chain from a root commit, the system adds a root commit to a new chain.

During the process, the system will maintain respective sets of completed chains and unfinished chains. The unfinished chains are chains in progress that might be extended further once additional commits are processed. Thus, the system adds all the newly initialized chains to the set of unfinished chains.

The system determines whether any unfinished chains remain (310). If not, the process ends (branch to end).

If there are unfinished chains remaining, the system selects a next unfinished chain C from the set of unfinished chains (320) and determines whether chain C can be extended (325).

In order to determine whether chain C can be extended, the system examines each of the child commits of chain C. In this context, a child commit of a chain means a child commit of the last commit in chain C. The child commits of chain C are candidates for extending chain C.

If any of the child commits of chain C can be added to chain C without violating any of the chain properties 1 through 3 (and optionally 4, 5, or both), the system determines that chain C can be extended (branch to 335).

If not, the system adds chain C to the set of finished chains if chain C is non-empty (branch to 330). The system can discards chain C if empty. The system then continues to step 335 to consider the children of chain C.

The system checks whether chain C has any unprocessed child commits (335). If not, the system again determines whether there are any unfinished chains (branch to 310).

But if chain C has unprocessed child commits, the system selects a next unprocessed child R (340), where R is a child commit of the last commit of chain C.

The system then determines whether R is a merge commit (345). If so, the system checks whether R has previously been traversed (350). If so, the system drops R from consideration and again determines whether C has unprocessed children (branch to 335).

If R has not been previously traversed, the system starts a new unfinished empty chain immediately after R (branch to 355). The new chain does not have R in it, and the new chain does not quite yet have any children of R. Rather, the children of R will be considered later. But after generating the new chain, the system continues to consider the chain being currently processed. Thus, the system continues to step 335 to determine whether chain C has any unprocessed children (335).

If R is not a merge commit (345), the system determines whether (1) chain C is empty or (2) chain C is finished or (3) chain C has a different author from R (360). If any one of these tests is true, the system starts a new unfinished chain of length one containing R (branch to 365). The system then again determines whether chain C has any unprocessed children (335).

If all three tests of step 360 are false, the system extends chain C by adding R to the end of chain C (branch to 370). The system then again determines whether chain C has any unprocessed children (335).

Figure 4:
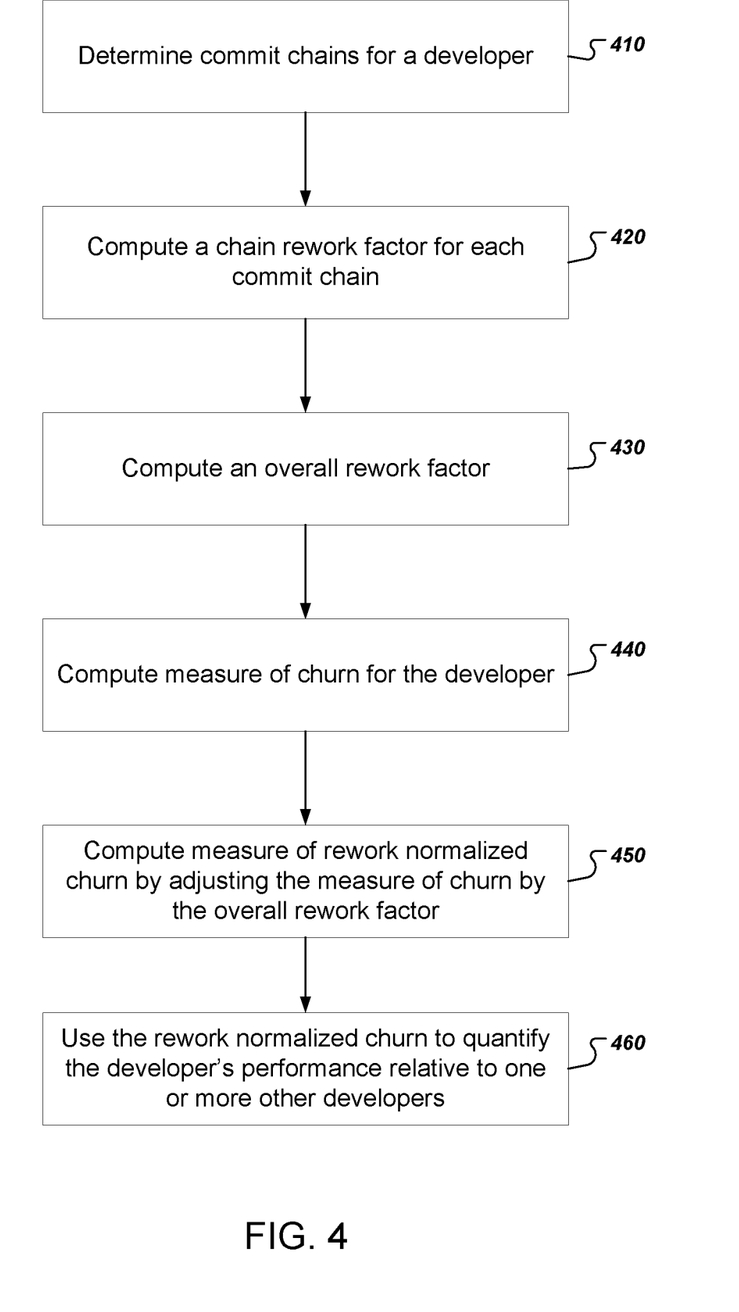
FIG. 4 is a flow chart of an example process for computing rework normalized churn.

FIG. 4 is a flow chart of an example process for computing rework normalized churn. In general, a system will use commit chains for a particular developer to compute statistics about the developers commit tendencies and use the statistics to compute a rework factor that can be used to adjust an initial measure of churn into a measure of rework normalized churn. The rework factor quantifies the relationship between raw churn over the entirety of a commit chain and the raw churn between individual commits of the commit chain. The system can then use the rework factors to compute rework normalized churn for a developer. The process will be described as being performed by a system of one or more appropriately programmed computers.

The system determines commit chains for a developer (410). For example, the system can perform the process described above with reference to FIG. 3. The commit chains that are determined will depend upon which, if any, optional properties described above are used when generating the commit chains.

The system computes a chain rework factor for each commit chain (420). The chain rework factor r represents a measure of churn within the chain that was reworked within the same chain. The rework factor r can be represented as a fraction, a percentage, or a score. For example, if the rework factor r is expressed as a fraction, and if the developer committed x lines of churn across the commit chain, then r*x of the lines can be considered to be rework churn.

To compute the rework factor r, the system compares two different measures of churn for the commit chain: (1) a squashed delta value between the last commit $S_o$ in the commit chain with a commit $S_o$ occurring just before the first commit in the commit chain and (2) a total chain delta value that represents the sum of individual measures of churn between adjacent commits in the commit chain.

The snapshot $S_o$ does not belong to the commit chain but is rather the parent of $S_1$, the first commit in the commit chain. By definition, $S_1$ has at most one parent because merge commits are not allowed to appear in commit chains. However, $S_1$ may have no parent at all, e.g., when $S_1$ is the oldest commit in the revision graph. In that case, the parent $S_o$ is considered to be an empty snapshot.

The system can compute the squashed delta value by computing a number of lines of code added, removed, or modified between $S_n$ and $S_o$.

The system can compute the total chain delta by summing individual counts of churn between adjacent commits in the commit chain. In other words, if the commit chain has three commits, the sum would include churn between $S_1$ and $S_2$ and also between $S_2$ and $S_3$.

The system can then compute the rework factor r by comparing the squashed delta value to the total chain delta value in any appropriate way, e.g., by computing a ratio between the two measures of churn. In some implementations, the system computes the rework factor r according to:

$$r = 1 - \frac{d(S_0, S_n)}{\sum \Delta_i},$$

where the numerator represents the squashed delta value and the denominator represents the total chain delta value.

The system can compute a particular rework factor in a similar way for each commit chain for the developer.

The system computes an overall rework factor for every developer or group of developers (430). The overall rework factor is a measure of central tendency for the individual rework factors associated with the commit chains, e.g. a weighted or unweighted arithmetic mean or geometric mean, a median, a mode, a minimum, or a maximum.

If computing a weighted measure of central tendency, the system can use either the squashed delta value or the total chain delta value as the weight for the corresponding rework factor. For example, the system can compute the overall rework factor according to:

$$R = \frac{\sum_i r_i d_i}{\sum_i d_i},$$

where each $r_i$ is the rework factor for chain i, and $d_i$ is the weight for chain i.

The system computes an initial measure of churn for the developer (440). The initial measure of churn can be computed by counting a number of lines added, removed, or modified in all commits by the developer to the code base.

The system computes a measure of rework normalized churn by adjusting the measure of churn by the overall rework factor (450). For example, the system can multiply the initial measure of churn by the overall rework factor to compute the measure of rework normalized churn.

The system uses the measure of rework normalized churn to quantify the developer's productivity relative to one or more other developers (460). The measure of rework normalized churn allows for a more accurate quantification of a developer's productivity regardless of the developer's particular commit tendencies.

The system can then compare the developer to one or more other developers. For example, the system can rank the developers by rework normalized churn. The system can for example provide a presentation that ranks developers of the code base according to rework normalized churn.

The system can also generate a presentation that plots rework normalized churn over time for each developer. For example, the cumulative rework normalized churn for each developer can be presented as a respective line in a two-dimensional graph presentation.

Alternatively or in addition, for techniques that use raw churn counts as a factor for ranking developers, the system can use the measure of rework normalized churn in place of the raw churn counts. One such technique is described in commonly owned U.S. patent application Ser. No. 14/534,172, entitled "Ranking Source Code Developers," which is herein incorporated by reference.

Figure 5:
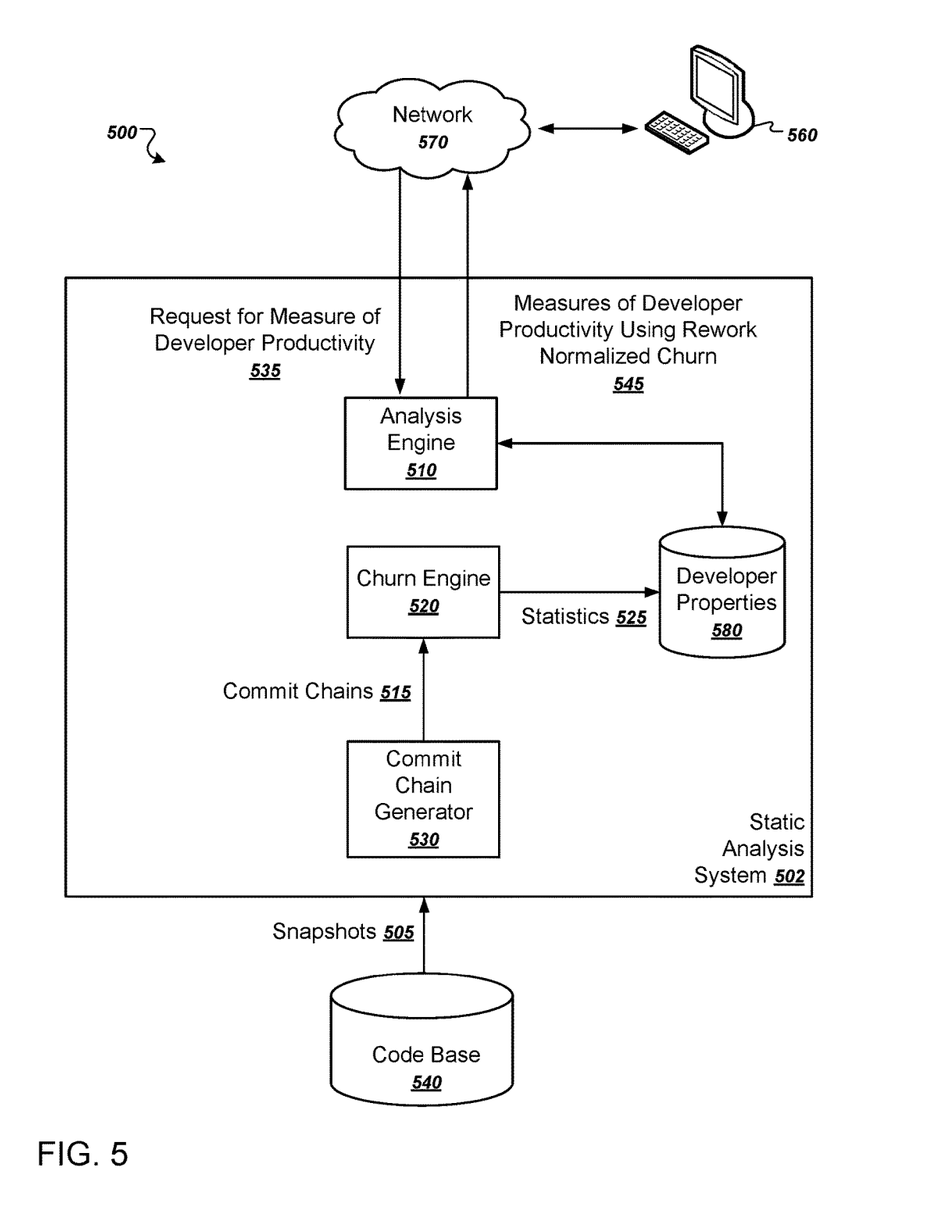

FIG. 5 is a diagram of an example system 500. The system 500 includes a user device 560 in communication with a static analysis system 502 over a network, 570, which can be any appropriate communications network. The system 500 is an example of a system in which a static analysis system 502 computes measures of rework normalized churn for developers of a code base 540 stored in a version control system.

The static analysis system includes an analysis engine 510, a churn engine 520, a commit chain generator 530, and a collection of developer properties 580. The components of the static analysis system 502 can be implemented as computer programs installed on one or more computers in one or more locations that are coupled to each through a network. Alternatively, the static analysis system 502 can be installed in whole or in part on a single computing device, e.g., the user device 560.

The collection of developer properties 580 maintains statistics for each developer of the code base 540 stored in the version control system. For example, the collection 580 can maintain measures of raw or rework normalized churn computed for the developer over each of multiple time periods or overall.

In operation, the static analysis system 502 receives snapshots 505 from the code base 540. A commit chain generator 530 uses the snapshots 505 to generate commit chains for each developer of the collection 580, e.g., as described above with reference to FIG. 3. The commit chain generator 530 then provides the determined commit chains 515 to a churn engine 520.

The churn engine 520 uses the snapshots and the commit chains 515 to compute one or more statistics 525 for each of the developers, including a measure of rework normalized churn for each of the developers.

Then, a user device 560 can provide a request for a measure of developer productivity 535 to an analysis engine 510 over the network 570. The request 535 can be a request to compute a measure of rework normalized churn for each developer or a request to rank developers according to rework normalized churn, to name just a few examples.

In response, the analysis engine 510 can use the statistics stored in the collection 580 to provide, back to the user device 560, measures developer productivity using rework normalized churn 545, which the user device 560 can present to a user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
determining a plurality of commit chains for a developer from a revision graph of a code base maintained by a version control system, wherein each commit chain of the plurality of commit chains has one or more commits by a same developer;
computing, for each commit chain in the plurality of commit chains for the developer, a respective measure of rework churn occurring in the commit chain, wherein rework churn in a commit chain comprises modifications to lines of source code including initial modifications occurring within the commit chain and, for each initial modification, any subsequent modifications occurring before an end of the commit chain;
computing an overall rework factor for the developer using the respective measures of rework churn for each commit chain in the plurality of commit chains for the developer;
computing an initial measure of churn for the developer, wherein the initial measure of churn represents a count of lines of source code added, removed, or modified by the developer in commits to the code base attributed to the developer;
computing a measure of rework normalized churn for the developer including adjusting the initial measure of churn by the overall rework factor; and
quantifying productivity of the developer relative to one or more other developers using the measure of rework normalized churn for the developer.

Embodiment 2 is the method of embodiment 1, wherein each commit chain of the plurality of commit chains contains no merge commits.

Embodiment 3 is the method of any one of embodiments 1-2, wherein each commit chain of the plurality of commit chains ends at commit N whenever a child of commit N has a sibling in the revision graph attributed to the same developer.

Embodiment 4 is the method of any one of embodiments 1-3, wherein each commit chain of the plurality of commit chains ends at commit N if a child of commit N has a sibling that is a merge commit.

Embodiment 5 is the method of any one of embodiments 1-4, wherein the rework churn comprises changes to lines of source code that are introduced by the developer within the commit chain and further modified before the end of the commit chain.

Embodiment 6 is the method of any one of embodiments 1-5, wherein computing a respective rework factor for each commit chain comprises comparing (1) a squashed delta value between a last commit in the commit chain with a commit occurring just before a first commit in the commit chain with (2) a total chain delta value, wherein the total chain delta value represents a sum of churn counts between adjacent commits of the commit chain.

Embodiment 7 is the method of embodiment 6, wherein the rework factor r for a commit chain is computed according to $r=1-S/T$, wherein S is the squashed delta value and T is the total chain delta value.

Embodiment 8 is the method of embodiment 6, wherein overall rework factor is a measure of central tendency of all of the rework factors for the plurality of commit chains.

Embodiment 9 is the method of embodiment 8, wherein computing the overall rework factor comprises computing a weighted average of the rework factors using a squashed delta value or a total chain delta value as respective weights for the weighted average.

Embodiment 10 is the method of any one of embodiments 1-9, wherein quantifying the productivity of the developer using the rework normalized churn for the developer comprises ranking the developer relative to one or more other developers according to respective measures of rework normalized churn.

Embodiment 11 is the method of any one of embodiments 1-10, wherein quantifying the productivity of the developer using the rework normalized churn for the developer comprises providing a graphical representation of the rework normalized churn over time for each developer.

Embodiment 12 is the method of any one of embodiments 1-11, further comprising receiving a selection of a subgraph of the revision graph of the code base wherein determining a plurality of commit chains for a developer comprises determining the plurality of commit chains from revisions that occur in the subgraph of the revision graph.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    determining a plurality of commit chains for a developer from a revision graph of a code base maintained by a version control system, wherein each commit chain of the plurality of commit chains has one or more commits by a same developer;
    computing, for each commit chain in the plurality of commit chains for the developer, a respective measure of rework churn occurring in the commit chain, wherein rework churn in a commit chain comprises modifications to lines of source code including initial modifications occurring within the commit chain and, for each initial modification, any subsequent modifications occurring before an end of the commit chain;
    computing an overall rework factor for the developer using the respective measures of rework churn for each commit chain in the plurality of commit chains for the developer;
    computing an initial measure of churn for the developer, wherein the initial measure of churn represents a count of lines of source code added, removed, or modified by the developer in commits to the code base attributed to the developer;
    computing a measure of rework normalized churn for the developer including adjusting the initial measure of churn by the overall rework factor; and
    quantifying productivity of the developer relative to one or more other developers using the measure of rework normalized churn for the developer.

2. The method of claim 1, wherein each commit chain of the plurality of commit chains contains no merge commits.

3. The method of claim 1, wherein each commit chain of the plurality of commit chains ends at commit N whenever a child of commit N has a sibling in the revision graph attributed to the same developer.

4. The method of claim 1, wherein each commit chain of the plurality of commit chains ends at commit N if a child of commit N has a sibling that is a merge commit.

5. The method of claim 1, wherein the rework churn comprises changes to lines of source code that are introduced by the developer within the commit chain and further modified before the end of the commit chain.

6. The method of claim 1, wherein computing a respective rework factor for each commit chain comprises comparing (1) a squashed delta value between a last commit in the commit chain with a commit occurring just before a first commit in the commit chain with (2) a total chain delta value, wherein the total chain delta value represents a sum of churn counts between adjacent commits of the commit chain.

7. The method of claim 6, wherein the rework factor r for a commit chain is computed according to $r=1-S/T$, wherein S is the squashed delta value and T is the total chain delta value.

8. The method of claim 6, wherein overall rework factor is a measure of central tendency of all of the rework factors for the plurality of commit chains.

9. The method of claim 8, wherein computing the overall rework factor comprises computing a weighted average of the rework factors using a squashed delta value or a total chain delta value as respective weights for the weighted average.

10. The method of claim 1, wherein quantifying the productivity of the developer using the rework normalized churn for the developer comprises ranking the developer relative to one or more other developers according to respective measures of rework normalized churn.

11. The method of claim 1, wherein quantifying the productivity of the developer using the rework normalized churn for the developer comprises providing a graphical representation of the rework normalized churn over time for each developer.

12. The method of claim 1, further comprising receiving a selection of a subgraph of the revision graph of the code base wherein determining a plurality of commit chains for a developer comprises determining the plurality of commit chains from revisions that occur in the subgraph of the revision graph.

13. A system comprising:
    one or more computers and one or more storage devices storing instructions that are operable, when executed by the one or more computers, to cause the one or more computers to perform operations comprising:

determining a plurality of commit chains for a developer from a revision graph of a code base maintained by a version control system, wherein each commit chain of the plurality of commit chains has one or more commits by a same developer;

computing, for each commit chain in the plurality of commit chains for the developer, a respective measure of rework churn occurring in the commit chain, wherein rework churn in a commit chain comprises modifications to lines of source code including initial modifications occurring within the commit chain and, for each initial modification, any subsequent modifications occurring before an end of the commit chain;

computing an overall rework factor for the developer using the respective measures of rework churn for each commit chain in the plurality of commit chains for the developer;

computing an initial measure of churn for the developer, wherein the initial measure of churn represents a count of lines of source code added, removed, or modified by the developer in commits to the code base attributed to the developer;

computing a measure of rework normalized churn for the developer including adjusting the initial measure of churn by the overall rework factor; and quantifying productivity of the developer relative to one or more other developers using the measure of rework normalized churn for the developer.

14. The system of claim 13, wherein each commit chain of the plurality of commit chains contains no merge commits.

15. The system of claim 13, wherein each commit chain of the plurality of commit chains ends at commit N whenever a child of commit N has a sibling in the revision graph attributed to the same developer.

16. The system of claim 13, wherein each commit chain of the plurality of commit chains ends at commit N if a child of commit N has a sibling that is a merge commit.

17. The system of claim 13, wherein the rework churn comprises changes to lines of source code that are introduced by the developer within the commit chain and further modified before the end of the commit chain.

18. The system of claim 13, wherein computing a respective rework factor for each commit chain comprises comparing (1) a squashed delta value between a last commit in the commit chain with a commit occurring just before a first commit in the commit chain with (2) a total chain delta value, wherein the total chain delta value represents a sum of churn counts between adjacent commits of the commit chain.

19. The system of claim 18, wherein the rework factor r for a commit chain is computed according to r=1−S/T, wherein S is the squashed delta value and T is the total chain delta value.

20. The system of claim 18, wherein overall rework factor is a measure of central tendency of all of the rework factors for the plurality of commit chains.

21. The system of claim 20, wherein computing the overall rework factor comprises computing a weighted average of the rework factors using a squashed delta value or a total chain delta value as respective weights for the weighted average.

22. The system of claim 13, wherein quantifying the productivity of the developer using the rework normalized churn for the developer comprises ranking the developer relative to one or more other developers according to respective measures of rework normalized churn.

23. The system of claim 13, wherein quantifying the productivity of the developer using the rework normalized churn for the developer comprises providing a graphical representation of the rework normalized churn over time for each developer.

24. The system of claim 13, wherein the operations further comprise receiving a selection of a subgraph of the revision graph of the code base wherein determining a plurality of commit chains for a developer comprises determining the plurality of commit chains from revisions that occur in the subgraph of the revision graph.

25. A computer program product, encoded on one or more non-transitory computer storage media, comprising instructions that when executed by one or more computers cause the one or more computers to perform operations comprising:

determining a plurality of commit chains for a developer from a revision graph of a code base maintained by a version control system, wherein each commit chain of the plurality of commit chains has one or more commits by a same developer;

computing, for each commit chain in the plurality of commit chains for the developer, a respective measure of rework churn occurring in the commit chain, wherein rework churn in a commit chain comprises modifications to lines of source code including initial modifications occurring within the commit chain and, for each initial modification, any subsequent modifications occurring before an end of the commit chain;

computing an overall rework factor for the developer using the respective measures of rework churn for each commit chain in the plurality of commit chains for the developer; computing an initial measure of churn for the developer, wherein the initial measure of churn represents a count of lines of source code added, removed, or modified by the developer in commits to the code base attributed to the developer;

computing a measure of rework normalized churn for the developer including adjusting the initial measure of churn by the overall rework factor; and quantifying productivity of the developer relative to one or more other developers using the measure of rework normalized churn for the developer.

26. The computer program product of claim 25, wherein each commit chain of the plurality of commit chains contains no merge commits.

27. The computer program product of claim 25, wherein each commit chain of the plurality of commit chains ends at commit N whenever a child of commit N has a sibling in the revision graph attributed to the same developer.

28. The computer program product of claim 25, wherein each commit chain of the plurality of commit chains ends at commit N if a child of commit N has a sibling that is a merge commit.

29. The computer program product of claim 25, wherein the rework churn comprises changes to lines of source code that are introduced by the developer within the commit chain and further modified before the end of the commit chain.

30. The computer program product of claim 25, wherein computing a respective rework factor for each commit chain comprises comparing (1) a squashed delta value between a last commit in the commit chain with a commit occurring just before a first commit in the commit chain with (2) a total chain delta value, wherein the total chain delta value represents a sum of churn counts between adjacent commits of the commit chain.

* * * * *